United States Patent [19]

Bernhardt et al.

[11] 4,424,633

[45] Jan. 10, 1984

[54] APPARATUS FOR HEATING AND DRYING ARTICLES

[75] Inventors: Karl-Heinz Bernhardt; Helmut Strzala, both of Braunfels, Fed. Rep. of Germany

[73] Assignee: Arthur Pfeiffer Vakuumtechnik Wetzlar GmbH, Assler, Fed. Rep. of Germany

[21] Appl. No.: 310,316

[22] Filed: Oct. 9, 1981

[30] Foreign Application Priority Data

Oct. 11, 1980 [DE] Fed. Rep. of Germany ....... 3038493

[51] Int. Cl.³ .............................................. F26B 21/14
[52] U.S. Cl. ........................................... 34/75; 34/77;
34/78; 134/40; 134/105
[58] Field of Search ...................... 134/21, 35, 40, 105,
134/109; 34/77, 92, 75, 78

[56] References Cited

U.S. PATENT DOCUMENTS

| 3,632,480 | 1/1972 | Suprenant et al. | 134/105 |
| 4,141,373 | 2/1979 | Kartanson et al. | 34/92 |
| 4,304,051 | 12/1981 | McLoughlin | 34/92 |
| 4,322,251 | 3/1982 | Elliott | 134/40 |

FOREIGN PATENT DOCUMENTS 241871 9/1925 United Kingdom ................... 34/78

Primary Examiner—Larry I. Schwartz
Attorney, Agent, or Firm—Toren, McGeady and Stanger

[57] ABSTRACT

Apparatus for heating and drying articles including an evacuable drying chamber for heating therein articles by condensation heat of the vapor of a first liquid supplied to the drying chamber, a vacuum pump for evacuating the boiler, a first vapor condenser and a second vapor condenser connected betwen the drying chamber and the vacuum pump, a thin film evaporator for receiving condensate from the drying chamber in the form of the first liquid and a second liquid having a higher boiling point than the first liquid, the second liquid being obtained from the articles within the drying chamber, a condensate collecting container for receiving from the evaporator liquid condensate which is not evaporated in the evaporator, a pressure barrier arranged between the evaporator and the collecting container and a re-evaporator arranged between the pressure barrier and the collecting container. The re-evaporator operates to lower the residual concentration of the first liquid and it is connected to the second vapor condenser thereby to reduce the residual concentration of the first liquid to a value corresponding to the vapor pressure in the second vapor condenser.

7 Claims, 3 Drawing Figures

APPARATUS FOR HEATING AND DRYING ARTICLES

The present invention relates generally to a plant or system utilized for heating articles such as paper insulated electrical components, for example transformers, condensors, measuring converters, current lead-in wires and the like. The articles are heated in a vacuum for the purpose of drying the articles and removing any gas therefrom.

Various methods are known whereby elements which are to be dried in a vacuum may be brought to desired temperatures. The present invention relates to a method utilizing condensation heating (vapor phase method).

The elements to be dried, which may essentially comprise the paper insulated electrical elements such as transformers, condensers, current converters, current lead-in wires and the like, are located in a vacuum-tight chamber or in their own vacuum-tight casing. Before the paper insulation is impregnated with transformer oil in order to increase the breakdown resistance thereof, any water in the paper resulting from moisture in the surrounding parts must be removed.

In order to effect this moisture removal, the elements are heated in a vacuum atmosphere. The water will vaporize and it will be deposited in a condenser which is connected in front of a vacuum pump. In order to heat the elements to the required drying temperature, the vapor of a liquid, such as kerosene, which boils at a low temperature is introduced into the chamber. While the vapor condenses on the surfaces of the elements which are usually colder than the vapor, the condensation heat which is released will be transferred to the elements and will thereby increase their temperature.

The condensate produced dissolves residues of oil adhering to the elements. This may occur in considerable quantity particularly in transformers which have been previously used. The liquid is collected for re-use and it is supplied to an evaporator by means of a feed pump. The kerosene used as the heat carrier has a vapor pressure which is lower than that of the water at all of the temperatures which may arise. In this way, it becomes possible to dry the elements during the heating operation by passing part of the flow of the vapor to a condenser which traps the water vapor escaping from the elements. A method of this type is known and standard embodiments thereof can be found in Oesch and Schatzl: Die Solventdampftrocknung von Leistungstransformatoren, Micafil Nachrichten, August 1976 and in the book by F. Kneule: Das Trocknen 3rd edition, publishers: Sauerländer, Aarau und Frankfurt/M. pp. 451–452.

In this method, there are used, for example, bubble evaporators. However, disadvantages arise in that the components of the evaporating solution which boil at a high temperature are enriched in the evaporator and lower the vapor pressure of the heat-carrying liquid. As a result, the output from the evaporator is decreased and the elements which are to be heated will no longer reach the prescribed temperatures. This will then require the performance of distillation runs in order to separate the heat-carrying liquid from the enriched oil. This tends to increase the cost of the procedures in terms of energy expended and time required.

In another known method, volatile fractions and fractions which only volatolize at a high temperature are separated by spraying superheated liquid under pressure through a nozzle into the drying chamber wherein the elements to be dried are located and by allowing this liquid to expand.

The volatile fractions evaporate thus lowering the vapor temperature because of the evaporation heat which has been consumed so that the elements which are to be dried are no longer damaged by excessive temperatures.

Components in the liquid which boil at a high temperature do not evaporate and are passed to a collecting vessel by way of suitable baffle plates or the like. In a case where the elements to be dried are transformers provided in their own casing, the expansion and evaporation is carried out in an expansion vessel connected prior to the transformers and connected to a collecting vessel for the fractions which do not easily boil. This method has disadvantages which involve high costs related to the apparatus and the control techniques.

In addition to the foregoing, there are also known falling film evaporators for thickening solutions in which the vapor is precipitated in a condenser and wherein the non-evaporating components are therefore enriched during circulation. The completeness of the separation of the two components in the solution depends upon the temperature in the vapor condenser. Since in the vapor phase method, the elements which are to be heated act as a condenser, the vapor pressure rises continuously during the heating phase and at the same time the concentration of the heat carrier is increased in the return line so that the use of a falling film evaporator does not in and of itself have any substantial advantages over a bubble evaporator.

Accordingly, the present invention seeks to eliminate or reduce the disadvantages discussed above and to enable continuous separation of the volatile and less volatile components of the contaminated heated liquid without increasing the energy costs while providing equipment which is relatively simple in its structure and operation.

SUMMARY OF THE INVENTION

Briefly, the present invention may be described as apparatus for heating and drying articles comprising an evacuable drying chamber for heating therein articles by condensation heat of the vapor of a first liquid supplied to the drying chamber, vacuum pump means for evacuating the drying chamber, vapor condenser means connected between the drying chamber and the vacuum pump means, thin film evaporator means receiving from the drying chamber condensate comprised of the first liquid and a second liquid having a higher boiling point than the first liquid obtained from articles within the drying chamber, with the evaporator means effecting evaporation of the first liquid and return thereof to the drying chamber, a collecting container for receiving from the evaporator means condensate not evaporated in the evaporator means, pressure barrier means arranged between the evaporator means and the collecting container and re-evaporator means arranged between the pressure barrier means and the collecting container. The re-evaporator means operates to lower the residual concentration of the first liquid and it is connected to the vapor condenser thereby to reduce the residual concentration of the first liquid to a value corresponding to the vapor pressure in the vapor condenser.

In a preferred embodiment of the invention the thin film evaporator is a falling film evaporator. A second vapor condenser may be provided between the drying chamber and the vacuum pump.

In this manner, the oil may be continuously separated from the heat carrier circuit. Furthermore, the collecting container may be connected to the condenser by means of a vapor line through which the residual components of the liquid which boil at a low temperature are regained and passed back to the vapor circuit while the evaporation heat may be obtained either by heat installation and/or by heating the collecting container.

It is also possible to use a separate part of the pipes of the falling film evaporator by supplying the oil/kerosene mixture passing through the pressure barrier to this part of the evaporator using an additional pump. Thus, the remaining parts of the heat carrying liquid may be separated off. This type of construction makes it possible to lower the construction height for the overall plant and it dispenses with the necessity for an additional evaporator. Furthermore, the re-evaporator means may be operated both with unidirectional flow and in counterflow.

While specific embodiments of the invention have been shown and described in detail to illustrate the application of the inventive principles, it will be understood that the invention may be embodied otherwise without departing from such principles.

DETAILED DESCRIPTION OF THE PREFERRED EMBODIMENTS

Figure 1:
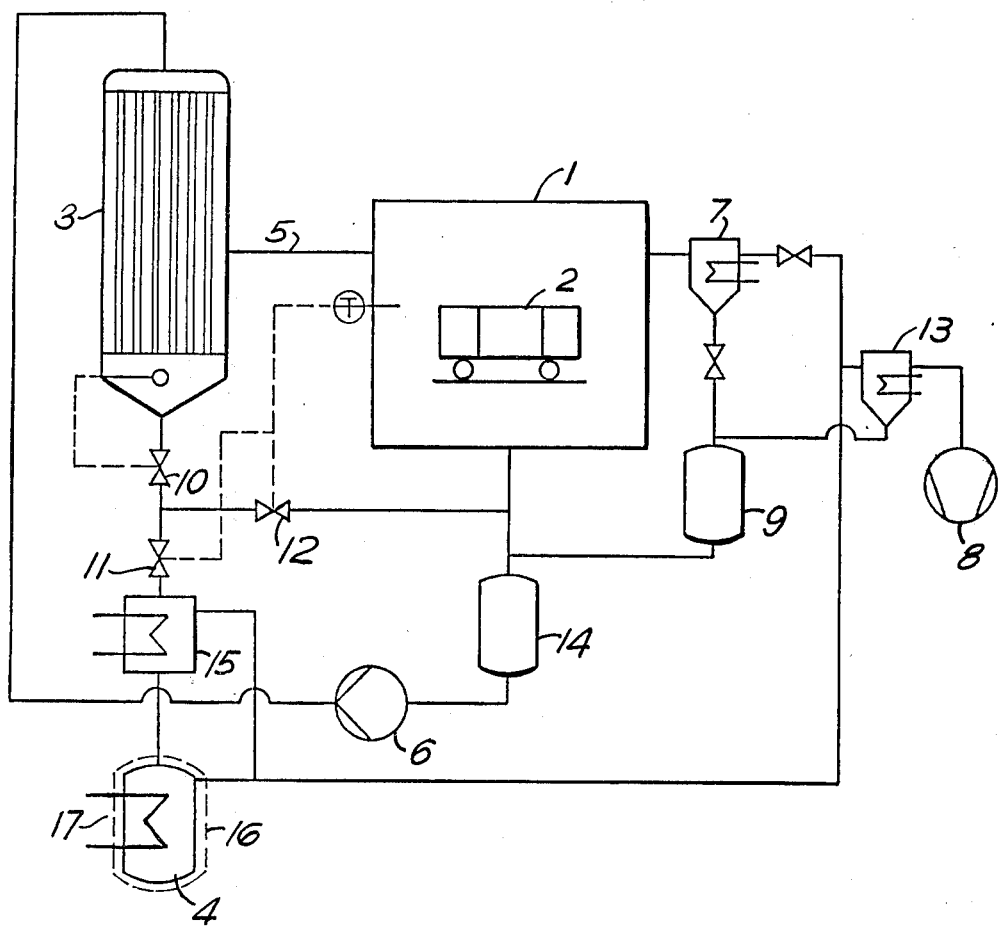
FIG. 1 is a schematic diagram showing an arrangement in accordance with the present invention.

Referring now to FIG. 1 wherein an overall system in accordance with the present invention is shown the elements which are to be dried are shown as located within a drying chamber 1 capable of being evacuated in order to form a vacuum therein. Kerosene vapor is introduced into drying chamber 1 from a thin film evaporator 3, preferably a falling film evaporator, through a line 5.

Within the drying chamber 1, the vapor condenses on the surfaces of the elements 2 and transfers its condensation heat to the elements 2. The resulting condensate is collected in a collecting container 14 located beneath the drying chamber 1 and it is supplied to the evaporator 3 by means of a feed pump 6.

The falling film evaporator is so formed that its heated surface is moistened by a thin film of the liquid which is to be evaporated whereby the temperature thereof may be maintained so that only a desired component of the liquid evaporates.

The return product is supplied to a re-evaporator 15 and to a collecting container 4 through pressure barrier forming means 10 which may comprise a regulating float valve. The re-evaporator 15 and the container 4 are both at a lower pressure than the falling film evaporator 3 by means of a connection to a condenser 13 and as a result of the reduced pressure the separated oil is again cleaned.

Figure 2:
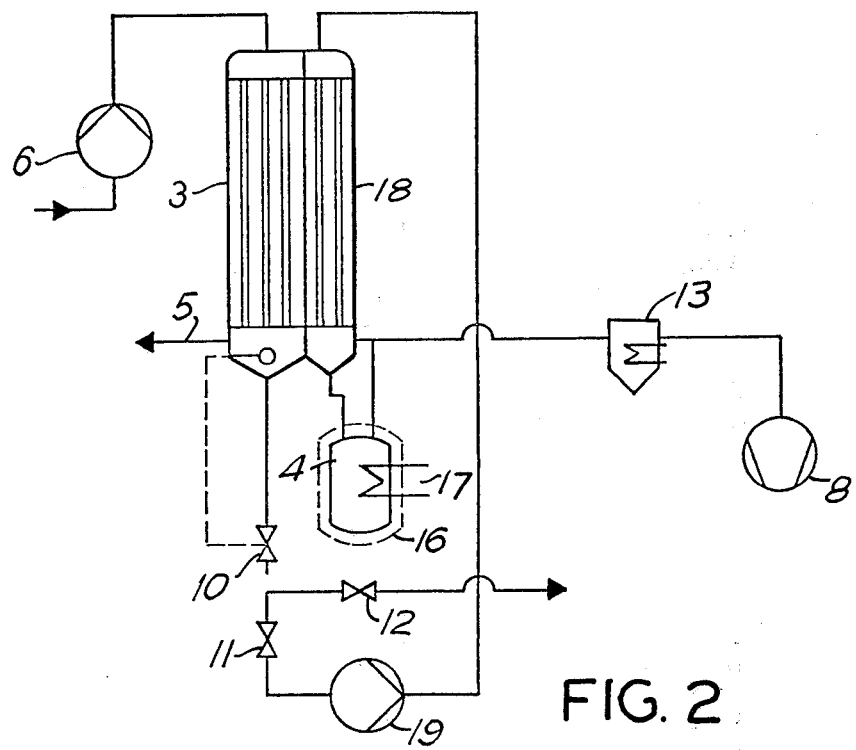
FIG. 2 is a schematic diagram showing a modified arrangement of the invention of FIG. 1 wherein a part of the falling film evaporator acts as the re-evaporator in a unidirectional flow arrangement.

In another embodiment of the invention, a part of the falling film evaporator may be used in a unidirectional flow method as the re-evaporator means. Such an embodiment is depicted in FIG. 2 wherein a part 18 of the falling film evaporator 3 is utilized in a unidirectional flow mode of operation as the re-evaporator means of the system. The return product escaping through the pressure barrier 10 is passed by a feed pump 19 to the right side, smaller part of the evaporator 18 and redistilled. The vapor condenses in the vapor condenser 13 and the remaining oil is collected in the container 4.

Figure 3:
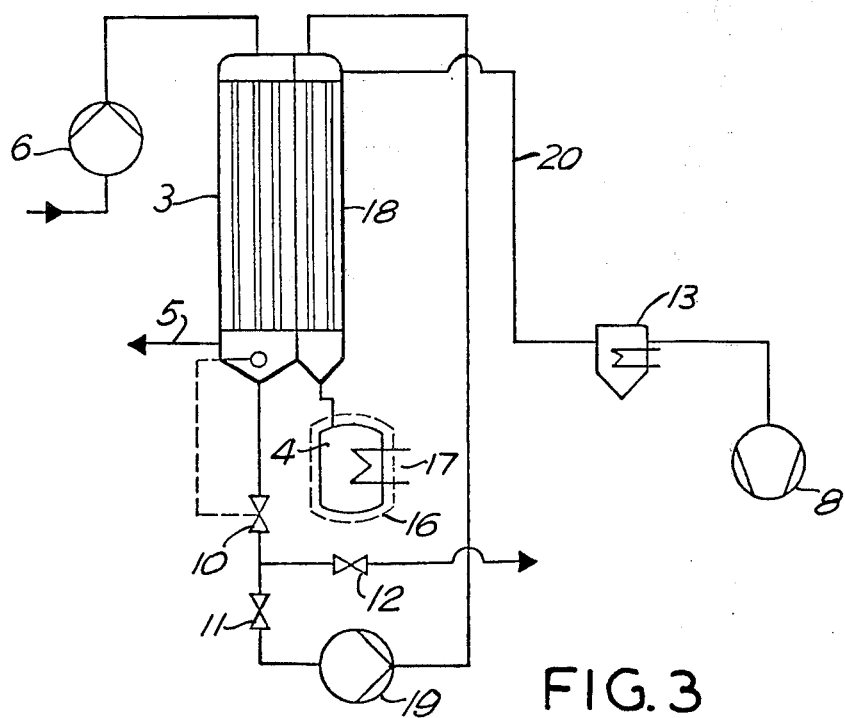
FIG. 3 is a schematic diagram showing a modification of the arrangement depicted in FIG. 2 wherein the re-evaporator is used in a counterflow mode.

In a further embodiment of the invention, similar to that of FIG. 2 wherein a part of the falling film evaporator is used as the re-evaporator means, the film evaporator may be operated in a counterflow mode. Such an embodiment is shown in FIG. 3 wherein the part 18 of the falling film evaporator 3 is used as the re-evaporator means with the evaporator being operated in the counterflow mode. In the embodiment of FIG. 3, vapor will then be supplied through a line 20 to the vapor condenser 13.

The collecting container 4 may be provided with additional heat insulation 16 and/or with an additional heating device 17 and it is emptied at the end of the charge.

The vacuum in the drying chamber 1 is produced and maintained by means of a vacuum pump 8 with a pre-connected condenser 7 and condensate collecting vessel 9 for the heating liquid.

Since the temperature of the elements to be heated will rise, the concentration of the heat carrier in the return line also rises and the specific heat of the solution will no longer be able to evaporate all of the kerosene. Moreover, at this point in time, the oil from the heated elements will already have been rinsed away and the small concentration of kerosene is no longer a problem. Furthermore, the kerosene concentration increases due to the fact that the articles in the drying chamber can no longer use up the energy available thereto because of its lack of sufficient cold surfaces. In other words, only a part of the heat carrying liquid supplied to the evaporator will evaporate.

Separation of the oil may be interrupted for this part of the heating phase by a valve 11 which is connected between the pressure barrier 10 and the re-evaporator 15 and which is closed depending upon temperature in the drying chamber. The valve 12 arranged between the connector of the pressure barrier with the valve 11 and the collecting container 14 for the drying chamber is opened and therefore the parts of the liquid mixture which have not evaporated are passed back into the collecting container 14. In this way, the output from the evaporator is matched to the reduced energy consumption of the drying chamber charge without changing the throughput of kerosene.

While specific embodiments of the invention have been shown and described in detail to illustrate the application of the inventive principles, it will be understood that the invention may be embodied otherwise without departing from such principles.

What is claimed is:

1. Apparatus for heating and drying articles under vacuum by the condensation heat of the vapor of a solvent comprising:

an evacuable drying chamber containing therein articles to be dried;

a vacuum pump means for evacuating said drying chamber;

thin film evaporator means supplying to said drying chamber a first liquid evaporated in said thin film evaporator means, the vapor of said first liquid being condensed within said drying chamber on said articles to be dried;

a first condenser connected to said drying chamber for condensing a part of said solvent vapor;

a second condenser connected by a throttle valve to said first condenser;

a separation tank which collects condensate from said first and said second condensers;

a collecting container wherein said condensed first liquid and a second liquid having a higher boiling point than said first liquid are collected, said collecting container being refilled with condensate from said separation tank;

a feed pump feeding back a mixture of said first and said second liquid to said thin film evaporator wherein said first liquid is evaporated to a residual concentration in said second liquid;

pressure barrier means through which said second liquid with a residual concentration of said first liquid escapes in re-evaporator means wherein the residual concentration of said first liquid is lowered by evaporating said first liquid, the vapor of which condenses in said second condenser; and oil collecting container means for collecting said second liquid.

2. Apparatus according to claim 1 wherein said thin film evaporator comprises a falling film evaporator.

3. Apparatus according to claim 1 wherein said oil collecting container means is heat insulated.

4. Apparatus according to claim 3 wherein said oil collecting container means is heated.

5. Apparatus according to claim 1 further comprising a first shut-off valve arranged between said pressure barrier means and said re-evaporator means, a connection line having a second shut-off valve arranged between the connection of said pressure barrier means and said first shut-off valve and second collecting container means for said drying chamber, with nonevaporating parts of said liquid being passed into said second collecting container means through said connection line when a high temperature exists in the drying chamber.

6. Apparatus according to claim 1 wherein said re-evaporator means consist of a part of said thin film evaporator means.

7. Apparatus for heating and drying articles comprising: an evacuable drying chamber for heating therein articles by condensation heat of the vapor of a first liquid supplied to said drying chamber; vacuum pump means for evacuating said drying chamber; vapor condenser means connected between said drying chamber and said vacuum pump means; thin film evaporator means receiving from said drying chamber condensate comprised of said first liquid and a second liquid having a higher boiling point than said first liquid obtained from articles within said drying chamber, said evaporator means effecting evaporation of said first liquid and return thereof to said drying chamber; a collecting container for receiving from said evaporator means condensate not evaporated in said evaporator means; pressure barrier means arranged between said evaporator means and said collecting container; and re-evaporator means arranged between said pressure barrier means and said collecting container, said re-evaporator means lowering the residual concentration of said first liquid and being connected to said vapor condenser means thereby to reduce the residual concentration of said first liquid to a value corresponding to the vapor pressure in said vapor condenser means; said apparatus further comprising a first shut-off valve arranged between said pressure barrier means and said re-evaporator means, a connection line having a second shut-off valve arranged between the connection of said pressure barrier means and said first shut-off valve and second collecting container means for said drying chamber, with nonevaporating parts of said liquid being passed into said second collecting container means through said connection line when a high temperature exists in the drying chamber.

* * * * *